(12) United States Patent
Morikazu et al.

(10) Patent No.: US 9,511,579 B2
(45) Date of Patent: *Dec. 6, 2016

(54) SEPARATION APPARATUS

(71) Applicant: DISCO CORPORATION, Tokyo (JP)

(72) Inventors: Hiroshi Morikazu, Tokyo (JP); Tasuku Koyanagi, Tokyo (JP); Shin Tabata, Tokyo (JP)

(73) Assignee: Disco Corporation, Tokyo (JP)

( * ) Notice: Subject to any disclaimer, the term of this patent is extended or adjusted under 35 U.S.C. 154(b) by 16 days.

This patent is subject to a terminal disclaimer.

(21) Appl. No.: 14/591,339

(22) Filed: Jan. 7, 2015

(65) Prior Publication Data

US 2015/0202857 A1 Jul. 23, 2015

(30) Foreign Application Priority Data

Jan. 22, 2014 (JP) ................................ 2014-009312

(51) Int. Cl.
*B32B 38/10* (2006.01)
*B32B 43/00* (2006.01)

(52) U.S. Cl.
CPC .............. *B32B 43/006* (2013.01); *B32B 38/10* (2013.01); *B32B 2457/14* (2013.01); *Y10T 156/1137* (2015.01); *Y10T 156/1184* (2015.01); *Y10T 156/1906* (2015.01); *Y10T 156/1939* (2015.01); *Y10T 156/1961* (2015.01); *Y10T 156/1967* (2015.01); *Y10T 156/1972* (2015.01)

(58) Field of Classification Search
CPC .. B32B 38/10; B32B 43/006; Y10T 156/1137; Y10T 156/1184; Y10T 156/1939; Y10T 156/1961; Y10T 156/1967

USPC .......................... 156/708, 717, 757, 761, 762
See application file for complete search history.

(56) References Cited

U.S. PATENT DOCUMENTS

| 6,221,740 | B1 * | 4/2001 | Bryan | ................... | B28D 5/0011 |
| | | | | | 125/23.01 |
| 6,418,999 | B1 * | 7/2002 | Yanagita | ................. | B26F 3/004 |
| | | | | | 156/756 |
| 2002/0029849 | A1 * | 3/2002 | Ohmi | ................ | H01L 21/67092 |
| | | | | | 156/708 |

(Continued)

FOREIGN PATENT DOCUMENTS

JP 2004-072052 3/2004

*Primary Examiner* — Mark A Osele
*Assistant Examiner* — Nickolas Harm
(74) *Attorney, Agent, or Firm* — Greer Burns & Crain Ltd.

(57) ABSTRACT

A separation apparatus for separating a composite substrate formed from a first substrate and a second substrate joined together includes an exfoliation unit for advancing into a boundary region between the first substrate and the second substrate of the composite substrate supported by a supporting face of a supporting base and a side face supporting unit to exfoliate the composite substrate into the first substrate and the second substrate. The exfoliation unit includes a wedge portion for advancing into the boundary region between the first substrate and the second substrate, an exfoliation member having a gas outlet open at a tip end of the wedge portion, and an exfoliation member advancing and retracting unit for advancing and retracting the wedge portion of the exfoliation member to and from the boundary region between the first substrate and the second substrate which configure the composite substrate.

1 Claim, 5 Drawing Sheets

(56) References Cited

U.S. PATENT DOCUMENTS

2003/0047280 A1* 3/2003 Takayama ................. B32B 7/06
156/708
2007/0261783 A1* 11/2007 Larson ................ B29C 63/0013
156/247

* cited by examiner

SEPARATION APPARATUS

BACKGROUND OF THE INVENTION

Field of the Invention

The present invention relates to a separation apparatus for separating a composite substrate formed from a first substrate and a second substrate joined together into the first substrate and the second substrate.

Description of the Related Art

In an optical device fabrication process, a light emitting layer formed from an n-type semiconductor layer and a p-type semiconductor layer configured from gallium nitride (GaN) or indium gallium phosphide (InGaP) or else aluminum gallium nitride (AlGaN) is stacked on the surface of a sapphire substrate or an epitaxy substrate of silicon carbide having a substantially disk shape with a buffer layer interposed therebetween. Further, optical devices such as light emitting diodes or laser diodes are formed in regions partitioned by a plurality of streets formed in a grid-like pattern on the light emitting layer to form an optical device wafer. Then, the optical device wafer is divided along the streets to fabricate individual optical devices.

Meanwhile, as a technology for improving the luminance of an optical device, a fabrication method called liftoff is disclosed in Japanese Patent Laid-Open No. 2004-72052. According to the fabrication method, to a light emitting layer formed from an n-type semiconductor layer and a p-type semiconductor layer stacked on the surface of a sapphire substrate or an epitaxy substrate of silicon carbide which configures an optical device wafer with a buffer layer interposed therebetween, a relocation substrate of molybdenum (Mo), copper (Cu), silicon (Si) or the like is joined with a bonding metal layer of a metal (AuSn) or the like interposed therebetween. Then, a laser beam of a wavelength (for example, 257 nm) which is absorbed by the buffer layer is irradiated upon the epitaxy substrate from the rear face side to break the buffer layer, and the epitaxy substrate is exfoliated from the light emitting layer while the light emitting layer is relocated to the relocation substrate.

SUMMARY OF THE INVENTION

However, if a laser beam is irradiated upon an epitaxy substrate from the rear face side with a focus point positioned at the buffer layer, then gallium nitride (GaN) or indium gallium phosphide (InGaP) or else aluminum gallium nitride (AlGaN) which configures the buffer layer is decomposed into Ga and gas ($N_2$ or the like) to break the buffer layer. However, there is a problem that a region in which gallium nitride (GaN) or indium gallium phosphide (InGaP) or else aluminum gallium nitride (AlGaN) is decomposed into Ga and gas ($N_2$ or the like) and another region in which no such decomposition occurs exist and irregularity occurs with the breakage of the buffer layer and the exfoliation of the epitaxy substrate cannot be carried out smoothly.

Further, there is another problem that, where recessions and projections are formed on the surface of the epitaxy substrate in order to improve the luminance of the optical device, there is a problem that the laser beam is intercepted by the wall of the recessions and projections and the breakage of the buffer layer is suppressed, resulting in difficulty of the exfoliation of the epitaxy substrate.

Therefore, it is an object of the present invention to provide a separation apparatus which can easily separate a composite substrate formed from a first substrate and a second substrate joined together into the first substrate and the second substrate.

In accordance with an aspect of the present invention, there is provided a separation apparatus for separating a composite substrate formed from a first substrate and a second substrate joined together into the first substrate and the second substrate, including a supporting base including a supporting face for supporting a composite substrate in a horizontal state thereon, side face supporting means disposed on the supporting base for supporting an outer peripheral side face of the composite substrate placed on the supporting face, and exfoliation means for advancing into a boundary region between the first substrate and the second substrate which configure the composite substrate supported by the supporting face of the supporting base and the side face supporting means to exfoliate the composite substrate into the first substrate and the second substrate, the exfoliation means including an exfoliation member disposed at a position opposing to the side face supporting means in a state parallel to the supporting face of the supporting base and having a wedge portion for advancing into the boundary region between the first substrate and the second substrate, the exfoliation member having a gas ejection port open at a tip end of the wedge portion, gas supplying means for supplying gas to the gas ejection port of the exfoliation member, exfoliation member positioning means for moving the exfoliation member in a direction perpendicular to the supporting face of the supporting base to position the wedge portion at the boundary region between the first substrate and the second substrate, and exfoliation member advancing and retracting means for advancing and retracting the wedge portion of the exfoliation member to and from the boundary region between the first substrate and the second substrate which configure the composite substrate supported by the supporting face of the supporting base and the side face supporting means.

Preferably, the side face supporting means is configured from at least two rollers and rotatably supports the outer peripheral side face of the composite substrate. Preferably, the separation apparatus further includes detection means for detecting the boundary region between the first substrate and the second substrate which configure the composite substrate supported by the supporting face of the supporting base and the side face supporting means to position the boundary region with respect to the wedge portion of the exfoliation member.

With the separation apparatus of the present invention, it includes the exfoliation member advancing and retracting means for advancing and retracting the wedge portion of the exfoliation member to and from the boundary region between the first substrate and the second substrate which configure the composite substrate supported by the supporting face of the supporting base and the side face supporting means. Therefore, when the wedge portion of the exfoliation member advances into the boundary region between the first substrate and the second substrate, exfoliation force can act at a plurality of locations of the outer peripheral portion of the first substrate and the second substrate. Accordingly, even if breakage of a buffer layer formed in the boundary region between an epitaxy substrate and a light emitting layer suffers from irregularity, for example, in liftoff working of exfoliating the epitaxy substrate from the light emitting layer to relocate the light emitting layer to a relocation substrate, or even if recessions and projections are formed on the surface of the epitaxy substrate, the epitaxy substrate can be exfoliated readily and with certainty.

Further, when the wedge portion of the exfoliation member advances into the boundary region between the first substrate and the second substrate as described hereinabove, gas is supplied from the gas supplying means into the gas ejection port of the exfoliation member and is then jetted from the tip end of the wedge portion to the boundary region between the first substrate and the second substrate. Therefore, the exfoliation of the first substrate and the second substrate from each other is further facilitated.

The above and other objects, features and advantages of the present invention and the manner of realizing them will become more apparent, and the invention itself fill best be understood, from a study of the following description and the appended claims with reference to the attached drawings showing a preferred embodiment of the invention.

DETAILED DESCRIPTION OF THE PREFERRED EMBODIMENT

Figure 1:
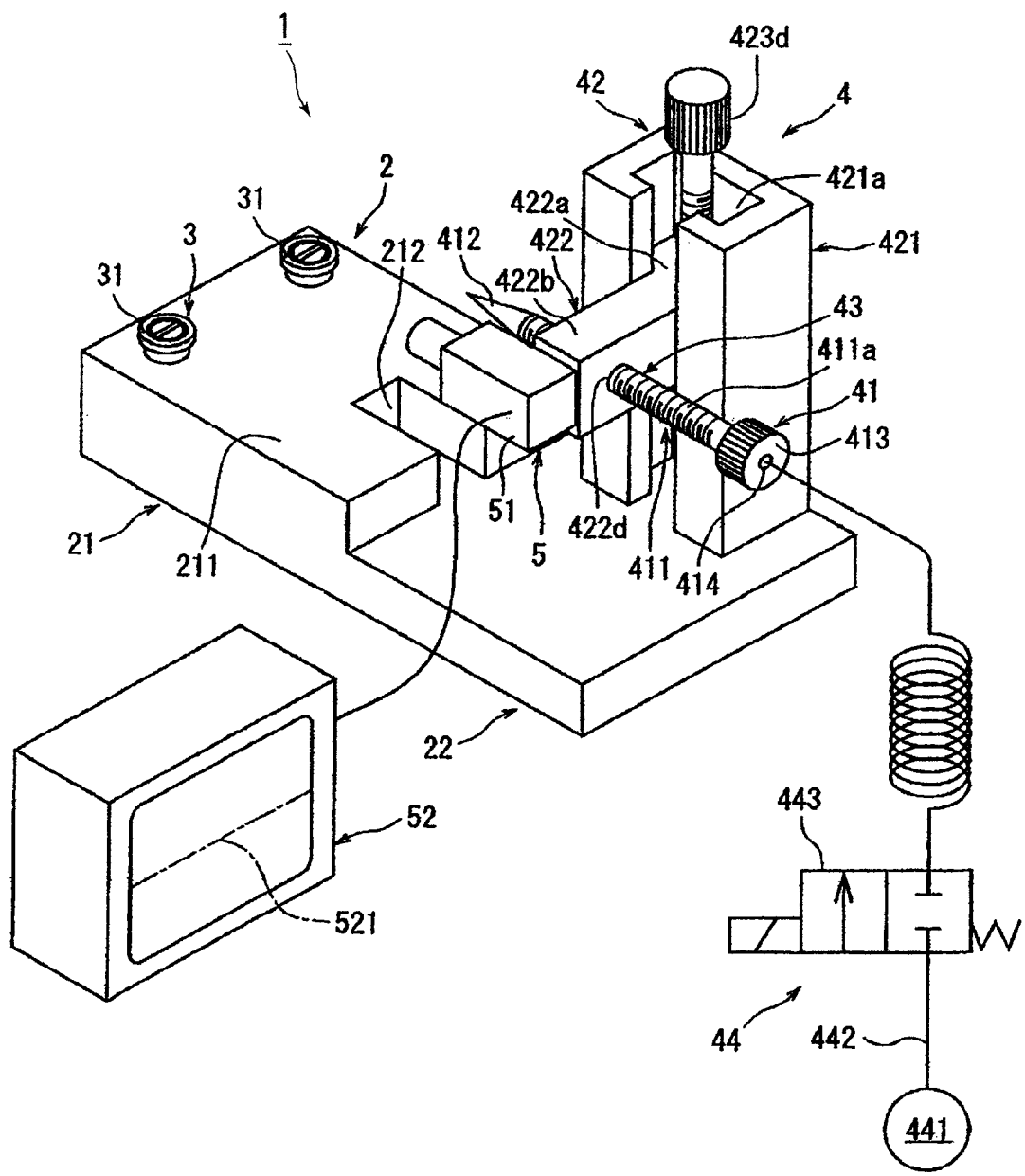
FIG. 1 is a perspective view of a separation apparatus configured in accordance with the present invention.

In the following, a preferred embodiment of a separation apparatus configured in accordance with the present invention is described in detail with reference to the accompanying drawings. In FIG. 1, a perspective view of the separation apparatus configured in accordance with the present invention is depicted, and in FIG. 2, a perspective view which depicts some components which configure the separation apparatus depicted in FIG. 1 in a disassembled state is depicted. The separation apparatus 1 includes a supporting base 2 for supporting a composite substrate, side face supporting means 3 for supporting an outer peripheral side face of the composite substrate placed on the supporting base 2, and exfoliation means 4 for exfoliating the composite substrate supported by the supporting base 2 and the side face supporting means 3.

The supporting base 2 is configured, in the present embodiment, a composite substrate supporting unit 21, and a exfoliation means supporting unit 22 formed by providing a step on the front side of the composite substrate supporting unit 21. The composite substrate supporting unit 21 includes a supporting face 211 for supporting a composite substrate in a horizontal state. Further, a clearance groove 212 for permitting movement of an exfoliation member hereinafter described is provided at a central portion of the front side (exfoliation means supporting unit 22 side) of the composite substrate supporting unit 21.

Figure 3:
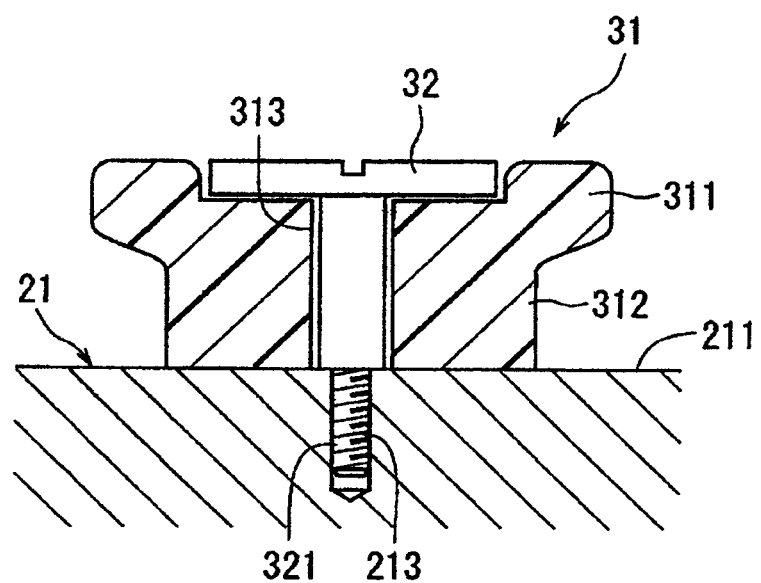
FIG. 3 is a partial sectional view of side face supporting means for configuring the separation apparatus depicted in FIG. 1.

The side face supporting means 3 is disposed on the supporting face 211 of the supporting base 2 formed in such a manner as just described. The side face supporting means 3 in the present embodiment is configured from two rollers 31. Each roller 31 includes an upper large diameter portion 311 and a lower small diameter portion 312 and has a through-hole 313 provided at a central portion thereof as depicted in FIG. 3, and is formed from a suitable synthetic resin. The roller 31 formed in this manner is supported for rotation by fitting a support bolt 32 into the through-hole 313 and screwing a male threaded portion 321 formed at a tip end portion of the support bolt 32 into a female thread 213 formed in the supporting base 2.

Figure 2:
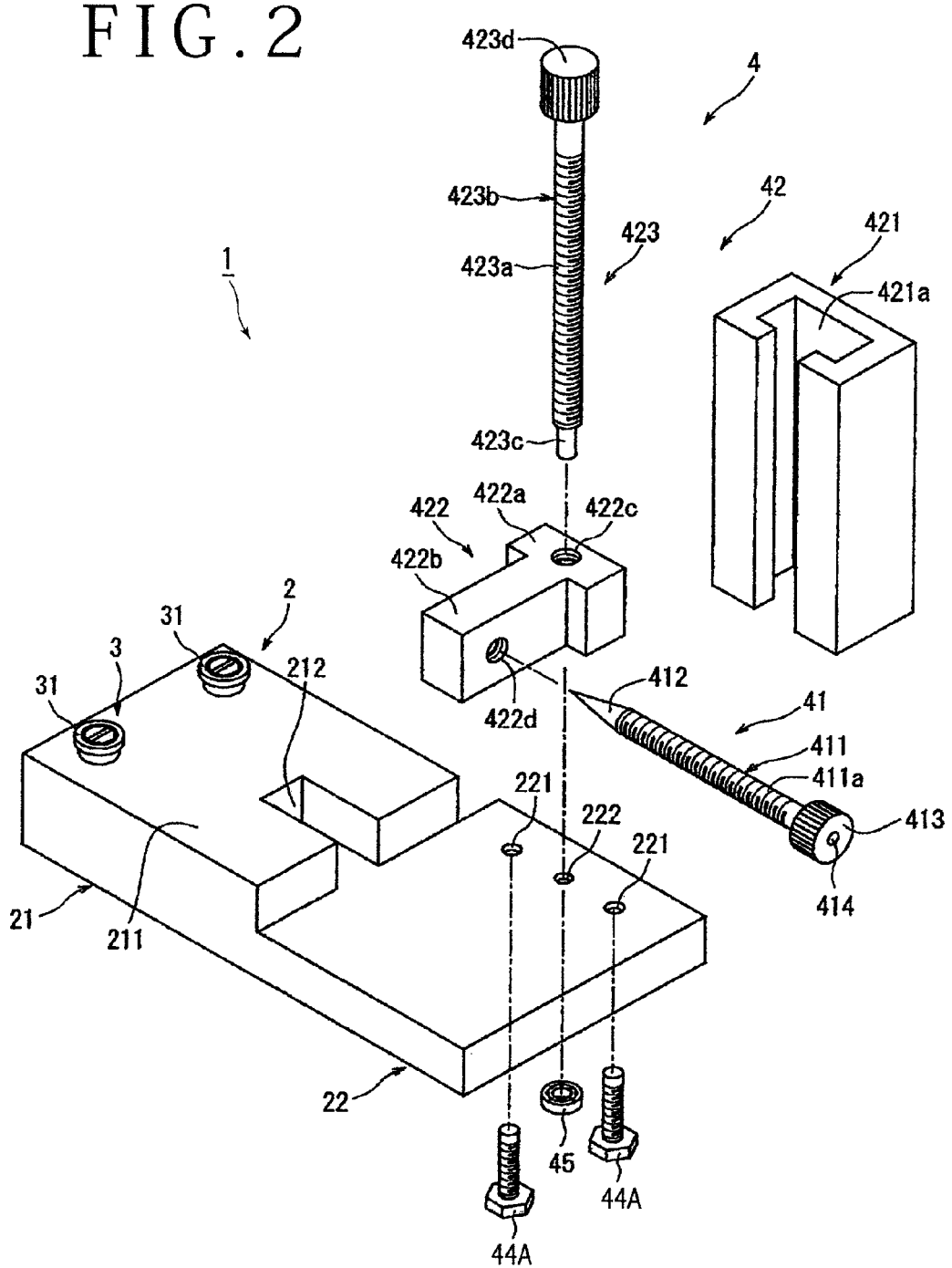
FIG. 2 is a perspective view depicting some components, which configure the separation apparatus depicted in FIG. 1, in a disassembled state.

Referring to FIGS. 1 and 2, the exfoliation means 4 includes an exfoliation member 41, exfoliation member positioning means 42 and exfoliation member advancing and retracting means 43. The exfoliation member 41 exfoliates a composite substrate supported by the supporting base 2 and the side face supporting means 3. The exfoliation member positioning means 42 moves the exfoliation member 41 in a direction perpendicular to the supporting face 211 of the supporting base 2. The exfoliation member advancing and retracting means 43 moves the exfoliation member 41 back and forth with respect to the composite substrate supported by the supporting base 2 and the side face supporting means 3.

Figure 4:
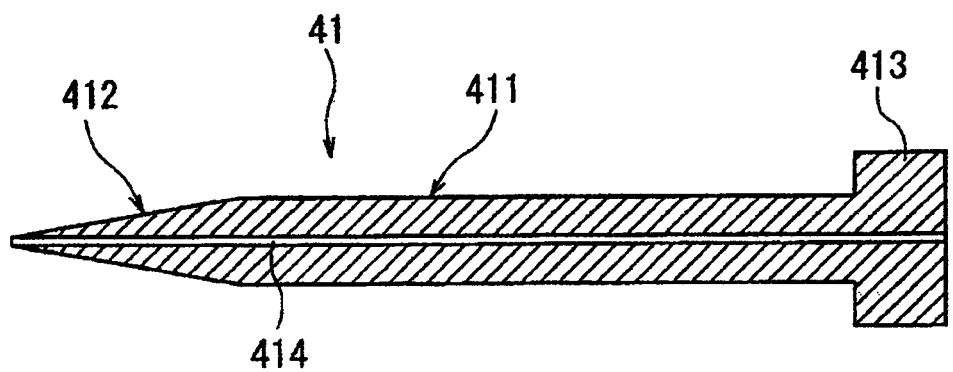
FIG. 4 is a sectional view of an exfoliation member which configures the separation apparatus depicted in FIG. 1.

The exfoliation member 41 which configures the exfoliation means 4 is configured from an exfoliation member main body 411, a conical wedge portion 412 and a rotating portion 413. The exfoliation member main body 411 has a male thread 411a formed on an outer peripheral face thereof. The conical wedge portion 412 is provided at one end portion of the exfoliation member main body 411, and the rotating portion 413 is provided at the other end of the exfoliation member main body 411. A gas ejection port 414 is provided in the exfoliation member 41 such that it opens to a tip end of the wedge portion 412 as depicted in FIG. 4. In this manner, the exfoliation member 41 is connected at the gas ejection port 414 thereof to gas supplying means 44 as depicted in FIG. 1. The gas supplying means 44 is configured from a compressed air source 441, an air supplying pipe 442 for connecting the compressed air source 441 and the gas ejection port 414 of the exfoliation member 41 to each other, and a solenoid valve 443 disposed in the air supplying pipe 442. The gas supplying means 44 configured in this manner supplies, if the solenoid valve 443 is opened, compressed air from the compressed air source 441 to the gas ejection port 414 of the exfoliation member 41 through the air supplying pipe 442. The compressed air supplied into the gas ejection port 414 in this manner is jetted from the tip end of the wedge portion 412.

The exfoliation member positioning means 42 includes a guide member 421, a movable block 422 and moving means 423. The guide member 421 is disposed on the exfoliation means supporting unit 22 of the supporting base 2, and the movable block 422 is disposed for up and down movement along the guide member 421. Further, the moving means 423 is provided to move the movable block 422 upwardly and downwardly along the guide member 421. The guide member 421 includes a T-shaped guide groove 421a formed in the upward and downward direction thereon, and two female threaded holes (not depicted) are provided at a lower end portion of the guide member 421 such that bolts are screwed therein. The guide member 421 formed in this manner is attached to the exfoliation means supporting unit 22 by placing the guide member 421 at a lower face thereof on two attachment holes 221 provided in the exfoliation means supporting unit 22 of the supporting base 2 and screwing attachment bolts 44A, which are disposed so as to be fitted in the attachment holes 221 from the lower side of the exfoliation means supporting unit 22, into female threaded holes not depicted. It is to be noted that, on the rear face of the exfoliation means supporting unit 22, recessed portions are provided corresponding to the attachment holes 221 such that head portions of the attachment bolts 44A are fitted therein.

The movable block 422 is formed in a T shape and includes a supported portion 422a for fitting in the guide groove 421a formed on the guide member 421 for sliding movement, and an exfoliation member supporting portion 422b formed so as to project from a side face of the supported portion 422a. A female threaded hole 422c is provided in the supported portion 422a such that it extends through the supported portion 422a in the upward and downward direction. Meanwhile, a female threaded portion 422d is provided in the exfoliation member supporting portion 422b such that it extends through the exfoliation member supporting portion 422b in a horizontal direction and is screwed with the male thread 411a formed on the exfoliation member main body 411 of the exfoliation member 41.

The moving means 423 includes a shank 423b, a supported portion 423c and a rotating portion 423d. The shank 423b has a male thread 423a formed on an outer peripheral face thereof so as to be screwed into the female threaded hole 422c provided in the supported portion 422a of the movable block 422. The supported portion 423c is provided at one end portion (lower end portion) of the shank 423b. The rotating portion 423d is provided at the other end (upper end) of the shank 423b. The moving means 423 configured in this manner is screwed at the shank 423b thereof, which has the male thread 423a formed thereon, into the female threaded hole 422c provided in the supported portion 422a of the movable block 422. The movable block 422 is fitted for sliding movement in the guide groove 421a formed on the guide member 421, and the supported portion 423c of the moving means 423 is fitted in a supporting hole 222 (refer to FIG. 2) provided in the exfoliation means supporting unit 22 of the supporting base 2 and is supported for rotation by a bearing 45 disposed on the exfoliation means supporting unit 22. Accordingly, by gripping the rotating portion 423d of the moving means 423 and rotating the shank 423b in one direction, the movable block 422 can be moved upwardly along the guide groove 421a, and by rotating the shank 423b in the other direction, the movable block 422 can be moved downwardly along the guide groove 421a. It is to be noted that, on the rear face of the exfoliation means supporting unit 22, a recessed portion is formed corresponding to the supporting hole 222 such that the bearing 45 is force fitted therein.

The exfoliation member 41 is screwed at the exfoliation member main body 411 thereof, on an outer peripheral face of which the male thread 411a is formed, into the female threaded hole 422d formed in the exfoliation member supporting portion 422b of the movable block 422. Then, by gripping the rotating portion 413 and rotating the exfoliation member main body 411 in one direction, the conical wedge portion 412 provided at one end of the exfoliation member main body 411 is moved forwardly toward the side face supporting means 3 side. Further, by rotating the exfoliation member main body 411 in the other direction, the conical wedge portion 412 provided at the one end of the exfoliation member main body 411 can be moved back to the side opposite to the side face supporting means 3 side. Accordingly, the male thread 411a formed on an outer peripheral face of the exfoliation member main body 411 of the exfoliation member 41, the rotating portion 413 provided at the other end of the exfoliation member main body 411 and the female threaded portion 422d formed on the exfoliation member supporting portion 422b of the movable block 422 function as exfoliation member advancing and retracting means 43 for moving the wedge portion 412 of the exfoliation member 41 back and forth with respect to a composite substrate supported by the supporting face 211 of the supporting base 2 and the side face supporting means 3.

Continuing the description with reference to FIG. 1, the separation apparatus 1 in the present embodiment includes detection means 5 for detecting a boundary region between a first substrate and a second substrate which configure a composite substrate hereinafter described supported by the supporting face 211 of the supporting base 2 and the side face supporting means 3 described hereinabove and positioning the boundary region with respect to the wedge portion 412 of the exfoliation member 41. This detection means 5 is configured from image pickup means 51 for picking up an image of a side face of a composite substrate hereinafter described supported by the supporting face 211 of the supporting base 2 and the side face supporting means 3, and display means 52 for displaying an image picked up by the image pickup means 51. The image pickup means 51 is mounted at a heightwise position same as that of the wedge portion 412 on the exfoliation member supporting portion 422b of the movable block 422 on which the exfoliation member 41 is mounted. Further, a hair line 521 corresponding to the wedge portion 412 which is the position of the center in the upward and downward direction of an image picked up by the image pickup means 51 is displayed on the display means 52.

Figure 5:
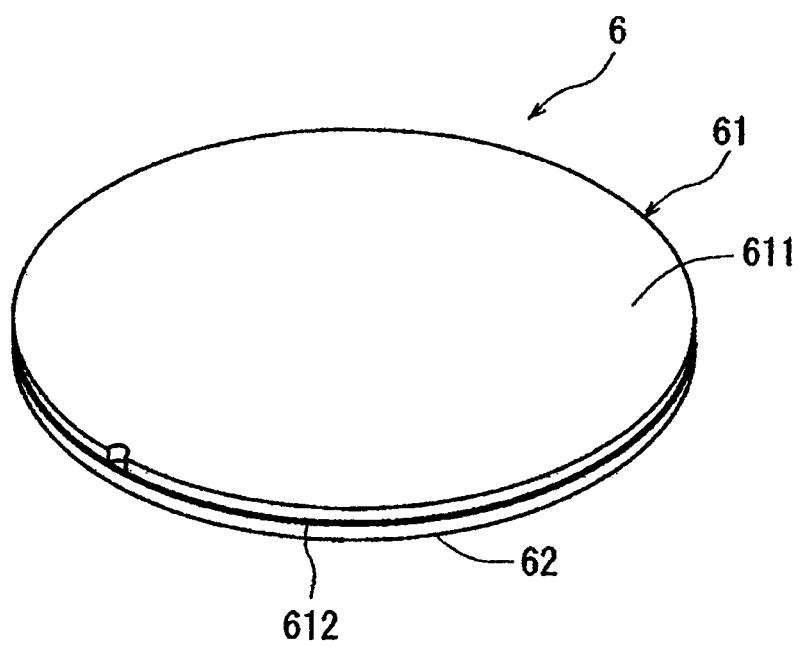
FIG. 5 is a perspective view of a composite substrate as a workpiece.

The separation apparatus 1 in the present embodiment is configured in such a manner as described above, and action of the separation apparatus 1 is described below. In FIG. 5, a perspective view of a composite substrate 6 to be separated by the separation apparatus 1 described above is depicted. The composite substrate 6 depicted in FIG. 5 is configured from an optical device wafer 61 and a relocation substrate 62. The optical device wafer 61 includes an optical device layer formed on the surface of an epitaxy substrate 611 (first substrate) such as a sapphire substrate or a silicon carbide substrate with a buffer layer 612 interposed therebetween. To the surface of the optical device layer of the epitaxy substrate 611 (first substrate) of the optical device wafer 61 formed in this manner, the relocation substrate 62 (second substrate) formed from molybdenum (Mo), copper (Cu), silicon (Si) or the like is joined with a bonding metal layer of gold-tin (AuSn) or the like interposed therebetween. In the composite substrate 6 configured in this manner, the buffer layer 612 is broken by irradiating a laser beam of a wavelength (for example, 257 nm), which is absorbed by the buffer layer 612, upon the epitaxy substrate 611 from the rear face side.

Figure 6:
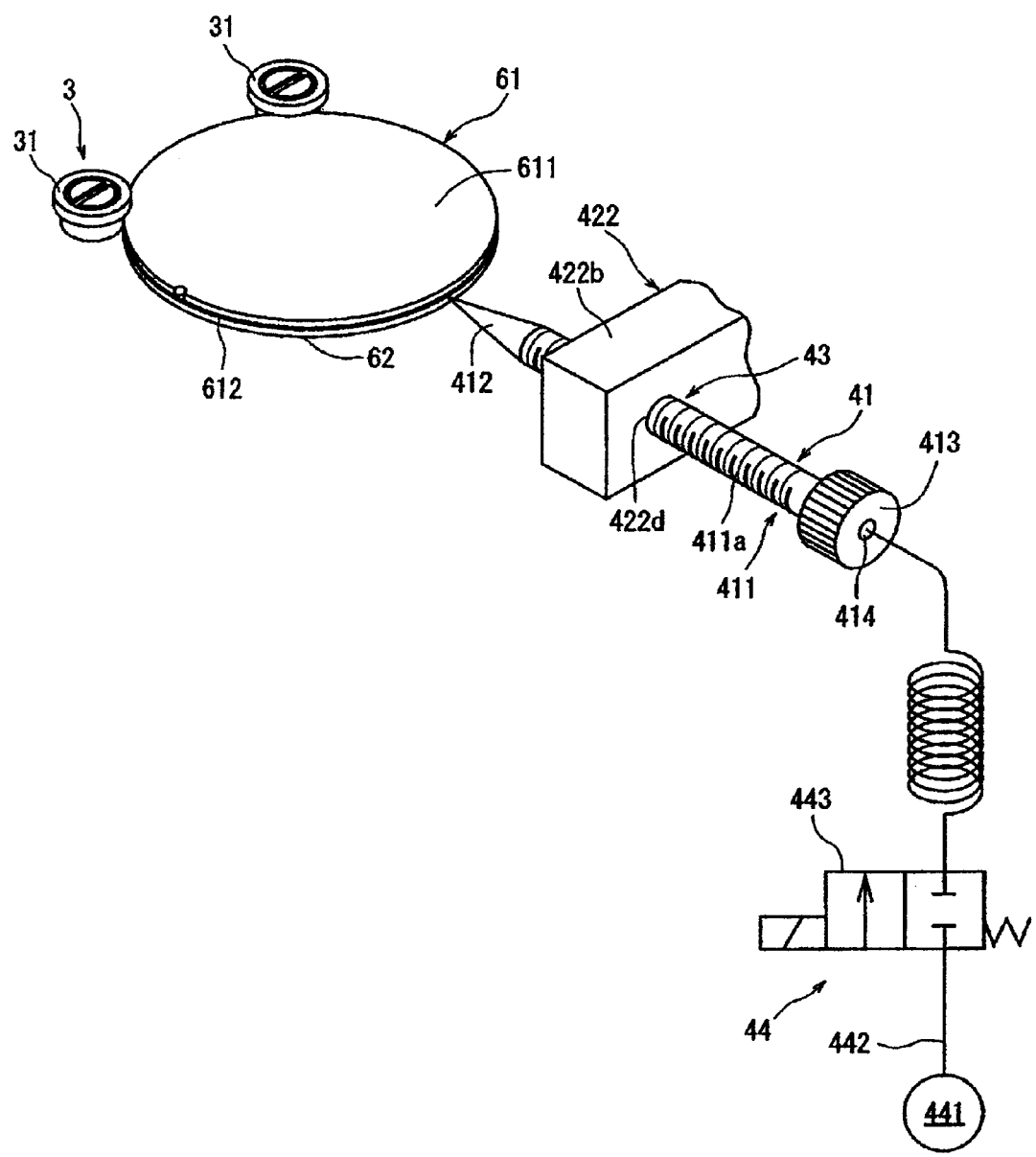
FIG. 6 is an explanatory view of an exfoliation member positioning step carried out using the separation apparatus depicted in FIG. 1.

In order to use the separation apparatus 1 described above to separate the composite substrate 6 into the epitaxy substrate 611 (first substrate) and the relocation substrate 62 (second substrate) including the optical device layer, the composite substrate 6 is placed at the relocation substrate 62 (second substrate) side thereof on the supporting face 211 of the supporting base 2. Further, the composite substrate 6 is abutted at the outer peripheral side face thereof with the two rollers 31 which configure the side face supporting means 3 as depicted in FIG. 6. The two rollers 31 with which the outer peripheral side face of the composite substrate 6 is abutted in this manner thus support the outer peripheral side face of the composite substrate 6 for rotation.

After the composite substrate 6 is supported by the supporting face 211 of the supporting base 2 and the two rollers 31 which configure the side face supporting means 3 in such a manner as described above, the rotating portion 423*d* of the moving means 423 which configures the exfoliation member positioning means 42 is rotated in one direction or the other direction. The movable block 422 is thereby moved upwardly or downwardly until a tip end of the wedge portion 412 of the exfoliation member 41 mounted on the movable block 422 as depicted in FIG. 6 is positioned at the heightwise position of the buffer layer 612 which is the boundary region between the epitaxy substrate 611 (first substrate) and the relocation substrate 62 (second substrate) including the optical device layer (exfoliation member positioning step). When the exfoliation member position step is carried out, the detection means 5 is operated such that an image of the outer peripheral side face of the composite substrate 6 is picked up by the image pickup means 51 and displayed on the display means 52. Thus, by positioning the buffer layer 612 at a position at which it is aligned with the hair line 521 (refer to FIG. 1), the tip end of the wedge portion 412 of the exfoliation member 41 can be positioned readily at the heightwise position of the buffer layer 612 which is the boundary region between the epitaxy substrate 611 (first substrate) and the relocation substrate 62 (second substrate) including the optical device layer.

Then, the rotating portion 413 of the exfoliation member 41 is rotated in one direction to advance the exfoliation member 41 toward the composite substrate 6 side until the tip end of the wedge portion 412 enters by 1 to 2 mm into the buffer layer 612 which is the boundary region between the epitaxy substrate 611 (first substrate) and the relocation substrate 62 (second substrate) including the optical device layer (wedge advancing step). At the wedge advancing step, the solenoid valve 443 of the gas supplying means 44 is turned ON to open the path as depicted in FIG. 6. Accordingly, compressed air is supplied from the compressed air source 441 into the gas ejection port 414 of the exfoliation member 41 through the air supplying pipe 442 and is jetted from the tip end of the wedge portion 412 to the buffer layer 612. As a result, since the buffer layer 612 is in a broken state as described hereinabove, the compressed air advances into the buffer layer 612 to facilitate exfoliation of the epitaxy substrate 611 (first substrate) and the relocation substrate 62 (second substrate) including the optical device layer from each other.

After the wedge entering process described above is carried out, the rotating portion 413 of the exfoliation member 41 is rotated in the other direction to retract the exfoliation member 41 to retract the wedge portion 412 from the buffer layer 612 which is the boundary region between the epitaxy substrate 611 (first substrate) and the relocation substrate 62 (second substrate) including the optical device layer (wedge retraction step). After the wedge retraction step described above is carried out, the composite substrate 6 is rotated by a predetermined angle (for example, 30 degrees) by the two rollers 31 (composite substrate positioning step).

Thereafter, when the wedge entering step, wedge retraction step and composite substrate positioning step are successively carried out, since the wedge portion 412 exerts exfoliating force to act at a plurality of locations of the outer peripheral portion of the epitaxy substrate 611 (first substrate) and the relocation substrate 62 (second substrate) including the optical device layer, the epitaxy substrate 611 (first substrate) can be exfoliated readily. As a result, the device layer formed on the surface of the epitaxy substrate 611 (first substrate) with the buffer layer 612 interposed therebetween is relocated to the relocation substrate 62 (second substrate). It is to be noted that, when the wedge advancing step described above is carried out, the solenoid valve 443 of the gas supplying means 44 is opened thereby to supply compressed air from the compressed air source 441 into the gas ejection port 414 of the exfoliation member 41 through the air supplying pipe 442 so that the compressed air is jetted from the tip end of the wedge portion 412 toward the buffer layer 612. Therefore, the exfoliation of the epitaxy substrate 611 (first substrate) and the relocation substrate 62 (second substrate) including the optical device layer is further facilitated.

While the present invention has been described based on the embodiment described above, the present invention is not limited to the embodiment described above, but various modifications are possible without departing from the subject matter of the present invention. For example, while the embodiment described above presents an example wherein the rotating portion 423*d* of the moving means 423 which configures the exfoliation member positioning means 42 and the rotating portion 413 of the exfoliation member 41 are rotated manually, as an alternative configuration, a pulse motor may be mounted on each of the rotating portion 423*d* and the rotating portion 413 while a rotatable chuck table for sucking and holding a composite substrate 6 thereon is disposed on the supporting face 211 of the supporting base 2 such that the composite substrate 6 is exfoliated into a first substrate and a second substrate automatically.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A separation apparatus for separating a composite substrate formed from a first substrate and a second substrate joined together into the first substrate and the second substrate, comprising:

a supporting base including a supporting face for supporting a composite substrate in a horizontal state thereon;

side face supporting means disposed on the supporting base for supporting an outer peripheral side face of the composite substrate placed on the supporting face; and exfoliation means for advancing into a boundary region between the first substrate and the second substrate which configure the composite substrate supported by the supporting face of the supporting base and the side face supporting means to exfoliate the composite substrate into the first substrate and the second substrate, the exfoliation means including an exfoliation member disposed at a position opposing to the side face supporting means in a state parallel to the supporting face of the supporting base and having a wedge portion for advancing into the boundary region between the first substrate and the second substrate, the exfoliation member having a gas ejection port open at a tip end of the wedge portion, gas supplying means for supplying gas to the gas ejection port of the exfoliation member, exfoliation member positioning means for moving the exfoliation member in a direction perpendicular to the supporting face of the supporting base to position the wedge portion at the boundary region between the first substrate and the second substrate, and exfoliation member advancing and retracting means for advancing and retracting the wedge portion of the exfoliation member to and from the boundary region between the first substrate and the second substrate which configure the composite substrate supported by the supporting face of the supporting base and the side face supporting means, wherein the side face supporting means is configured from at least two rollers and rotatably supports the outer peripheral side face of the composite substrate.

* * * * *